United States Patent
Bartley et al.

(10) Patent No.: US 7,185,093 B2
(45) Date of Patent: Feb. 27, 2007

(54) COMPUTER SYSTEM, METHOD, AND BUSINESS METHOD FOR ENABLING CUSTOMER ACCESS TO COMPUTER SYSTEM PERFORMANCE DATA IN EXCHANGE FOR ALLOWING ACCESS TO THE PERFORMANCE DATA BY ANOTHER COMPUTER SYSTEM

(75) Inventors: Royan Herbert Bartley, Rochester, MN (US); Michael John Branson, Rochester, MN (US); Steven Gene Halverson, Rochester, MN (US); David Alan Jaeger, Red Wing, MN (US); Todd Mark Kelsey, Rochester, MN (US); Paul William Wertzler, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1146 days.

(21) Appl. No.: 09/892,424

(22) Filed: Jun. 27, 2001

(65) Prior Publication Data

US 2003/0005108 A1    Jan. 2, 2003

(51) Int. Cl.
    *G06F 15/173*    (2006.01)
(52) U.S. Cl. .................... 709/225; 709/224; 709/229
(58) Field of Classification Search ............... 709/216, 709/218, 224, 229; 370/252; 705/7; 707/10
    See application file for complete search history.

(56) References Cited

U.S. PATENT DOCUMENTS

| | | | |
|---|---|---|---|
| 4,905,171 A | 2/1990 | Kiel et al. ............. 364/551.01 |
| 5,408,618 A | 4/1995 | Aho et al. .................. 395/325 |
| 5,627,766 A | 5/1997 | Beaven .................. 364/551.01 |
| 5,696,701 A | 12/1997 | Burgess et al. .......... 395/200.5 |
| 5,704,031 A | 12/1997 | Mikami et al. |
| 5,758,071 A | 5/1998 | Burgess et al. .......... 395/200.5 |
| 5,796,633 A | 8/1998 | Burgess et al. ........ 364/551.01 |
| 5,826,000 A | 10/1998 | Hamilton |
| 5,828,899 A | 10/1998 | Richard et al. |
| 5,845,077 A | 12/1998 | Fawcett |
| 5,848,231 A | 12/1998 | Teitelbaum et al. |
| 5,918,019 A | 6/1999 | Valencia |
| 5,926,624 A | 7/1999 | Katz et al. |
| 5,930,357 A | 7/1999 | Fukui |
| 5,949,976 A | 9/1999 | Chappelle .............. 395/200.54 |

(Continued)

OTHER PUBLICATIONS

Emil Abrascid, Data Manager Online, Copyright 1999.

(Continued)

*Primary Examiner*—Le Hien Luu
(74) *Attorney, Agent, or Firm*—Martin & Associates, LLC; Derel P. Martin

(57) ABSTRACT

An apparatus, method, and business method allow a customer to access performance data only if transmission of the performance data to the vendor is enabled. In a first embodiment, the customer cannot access any performance data unless transmission of the performance data to the vendor is enabled. In a second embodiment, the customer can access some limited performance data, but cannot access more extensive performance data unless transmission of the performance data to the vendor is enabled. The preferred embodiments provide the capability of a customer accessing historical performance data in exchange for the customer transmitting the performance data to the vendor. In this manner the needs of both vendor and customer are satisfied.

22 Claims, 6 Drawing Sheets

U.S. PATENT DOCUMENTS

| | | | |
|---|---|---|---|
| 5,961,596 A | 10/1999 | Takubo et al. | 709/224 |
| 6,098,098 A | 8/2000 | Sandahl et al. | |
| 6,130,892 A | 10/2000 | Short et al. | |
| 6,138,249 A | 10/2000 | Nolet | |
| 6,170,060 B1 | 1/2001 | Mott et al. | |
| 6,247,128 B1 | 6/2001 | Fisher et al. | |
| 6,289,462 B1 | 9/2001 | McNabb et al. | |
| 6,321,338 B1 | 11/2001 | Porras et al. | |
| 6,425,126 B1 | 7/2002 | Branson et al. | |
| 6,510,463 B1 | 1/2003 | Farhat et al. | |
| 6,591,418 B2 | 7/2003 | Bryan et al. | |
| 6,643,654 B1 * | 11/2003 | Patel et al. | 707/10 |
| 6,645,077 B2 | 11/2003 | Rowe | |
| 6,654,891 B1 | 11/2003 | Borsato et al. | |
| 6,708,155 B1 * | 3/2004 | Honarvar et al. | 705/7 |
| 6,714,976 B1 | 3/2004 | Wilson et al. | |
| 6,775,699 B1 * | 8/2004 | DeLuca et al. | 709/224 |
| 6,792,455 B1 * | 9/2004 | DeLuca et al. | 709/224 |
| 6,798,997 B1 | 9/2004 | Hayward et al. | |
| 6,813,248 B1 * | 11/2004 | Boss et al. | 370/252 |
| 2001/0029526 A1 | 10/2001 | Yokoyama et al. | |
| 2002/0052947 A1 * | 5/2002 | Duimovich et al. | 709/224 |
| 2002/0099812 A1 | 7/2002 | Davis et al. | |
| 2002/0129356 A1 | 9/2002 | Hellerstein et al. | |
| 2002/0147757 A1 | 10/2002 | Day et al. | |
| 2002/0156884 A1 * | 10/2002 | Bertram et al. | 709/224 |
| 2002/0188941 A1 | 12/2002 | Cicciarelli et al. | |

OTHER PUBLICATIONS

IBM e-business on demand: the next wave of IT Services by IBM Global Services, Jan. 2002.

U.S. Appl. , "Apparatus, Method, and Business Method for Enabling Customer Access to Computer System Execution Data in Exchange for Sharing the Execution Data," No. 09/892,435, filed on Jun. 27, 2001.

U.S. Appl., "Method and Apparatus for Automating Software Upgrades," No. 09/912,975, filed on Jul. 25, 2001.

U.S. Appl. , "Method and Apparatus Upgrade Assistance Using Critical Historical Product Information," No., 09/865,371, filed on May 25, 2001.

U.S. Appl., "Physical Device Placement Assistant," No. 09/865,798, filed on May 25, 2001.

AS/400 Publication, "Performance Management/400 Offerings and Services, including Performance Management/400—Subset," Version 3, SC41-0145-02, Sep. 1994.

* cited by examiner

COMPUTER SYSTEM, METHOD, AND BUSINESS METHOD FOR ENABLING CUSTOMER ACCESS TO COMPUTER SYSTEM PERFORMANCE DATA IN EXCHANGE FOR ALLOWING ACCESS TO THE PERFORMANCE DATA BY ANOTHER COMPUTER SYSTEM

RELATED APPLICATION

This patent application is related to a concurrently filed U.S. patent application, "Apparatus, Method, and Business Method for Enabling Customer Access to Computer System Execution Data in Exchange for Sharing the Execution Data" Ser. No. 09/892,435 filed on Jun. 27, 2001.

BACKGROUND OF THE INVENTION

1. Technical Field

This invention generally relates to the data processing field, and more specifically relates to the gathering and monitoring of performance data in computer systems.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor.

The performance of a computer system depends on many factors that are determined by hardware, software, and other dynamic considerations such as total number of programs being processed, network traffic load, cache efficiency, etc. The performance of computer systems is of great interest to customers that purchase and depend on these computer systems. In addition, the performance of these computer systems is also of interest to the computer system vendor to determine whether the performance could be improved by selling additional hardware, software, or services to the customer to better meet the customer's needs.

Current operating systems collect performance data as a computer runs. Some operating systems provide unrestricted customer access to performance data, allowing the customer to view the performance data historically for a defined period, such as the past six months. Providing the customer with unrestricted access to the performance data for the customer's computer systems may result in a loss of marketing opportunity for the computer system vendor. For example, if the performance data indicates that disk utilization is high, the customer may purchase a new disk drive from a different vendor rather than from the vendor that sold the customer the computer system. In addition, unrestricted access by the customer to the performance data without fee eliminates an opportunity to sell reports and analysis services to the customers. Without a way to strike a balance between the customer's need to analyze performance data and the vendor's need to collect the performance data from the customer, the needs of both vendors and customers will continue to be unsatisfied.

DISCLOSURE OF INVENTION

According to the preferred embodiments, an apparatus, method, and business method allow a customer to access performance data only if transmission of the performance data to the vendor is enabled. In a first embodiment, the customer cannot access any performance data unless transmission of the performance data to the vendor is enabled. In a second embodiment, the customer can access some limited performance data, but cannot access more extensive performance data unless transmission of the performance data to the vendor is enabled. The preferred embodiments provide the capability of a customer accessing historical performance data in exchange for the customer transmitting the performance data to the vendor. In this manner the needs of both vendor and customer are satisfied.

The foregoing and other features and advantages of the invention will be apparent from the following more particular description of preferred embodiments of the invention, as illustrated in the accompanying drawings.

BRIEF DESCRIPTION OF DRAWINGS

The preferred exemplary embodiments of the present invention will hereinafter be described in conjunction with the appended drawings, where like designations denote like elements, and.

BEST MODE FOR CARRYING OUT THE INVENTION

An apparatus, method, and business method in accordance with the preferred embodiments allows a customer to access performance data collected on the customer's computer system in exchange for transmitting the collected performance data to the vendor. In one embodiment, no access to performance data by the customer is allowed unless transmission of the performance data is enabled to the vendor. In a second embodiment, limited access by the customer is allowed, but if more extensive access is needed, the customer must enable transmission of the performance data to the vendor in order to receive the extensive access to performance data.

Vendors have a great interest in accessing performance data for their customer's computer systems because this performance data may allow selling other products to the customers, such as additional hardware if resources are constrained, additional software if performance improvements can be realized, or services such as reports and analysis of the performance data. In the prior art, vendors are left with the untenable dilemma of whether to allow unrestricted access to performance data by customers, thereby losing marketing opportunities, or to allow no access or very limited access to performance data, thereby frustrating customers that need to access and analyze more extensive performance data. The preferred embodiments solves this dilemma by providing a method for allowing extensive access to performance data by the customer only if the customer enables transmission of the performance data to the vendor. In this manner, both vendor and client get what they need, namely access to the performance data for their own business purposes.

Figure 1:
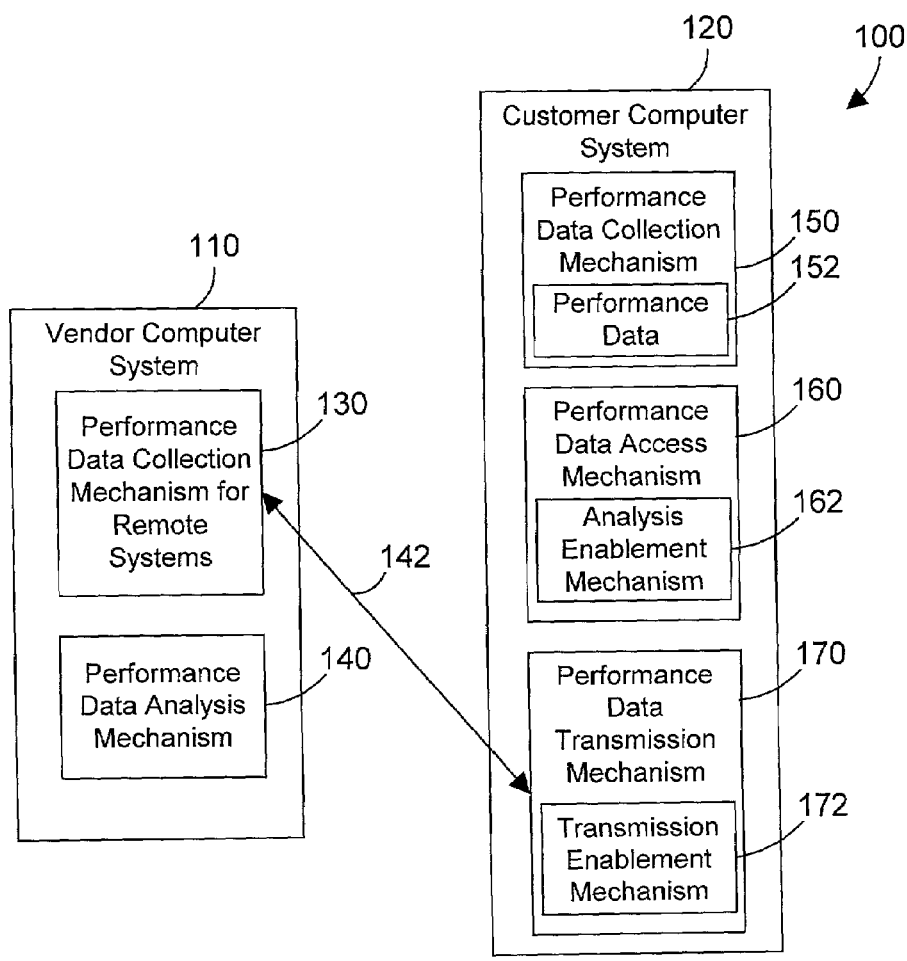
FIG. 1 is a block diagram showing a vendor computer system and a customer computer system in accordance with the preferred embodiments.

Referring to FIG. 1, a vendor computer system 110 is coupled to a customer computer system 120. The vendor computer system 110 includes a performance data collection mechanism for remote systems 130, and a performance data analysis mechanism 140. Performance data collection mechanism 130 is a mechanism that collects performance data from a customer computer system, while performance data analysis mechanism 140 is used to analyze the data to determine if the customer may need additional products from the vendor (e.g., hardware, software, services). Note that the term "performance data" as used herein is a very broad term that can include anything that can effect or measure the performance of a computer system. Examples of certain performance data include CPU utilization, available memory, cache hit ratio, response time, disk utilization, I/O rate, LAN utilization, etc.

Customer computer system 120 includes a performance data collection mechanism 150, a performance data access mechanism 160, and a performance data transmission mechanism 170. Performance data collection mechanism 150 collects performance data 152 as the customer computer system 120 runs, and logs the performance data 152 for future access. Performance data access mechanism 160 controls access to the performance data 152 by the customer. In the preferred embodiments, performance data access mechanism 160 includes an access enablement mechanism 162 that determines whether or not the user will be able to access the performance data 152 collected by the performance data collection mechanism 150. In a first embodiment, if the access enablement mechanism 162 is enabled, the user will be able to access the performance data. If the access enablement mechanism 162 is disabled, the user will not be able to access the performance data. In a second embodiment, if the access enablement mechanism 162 is enabled, the user will be able to access all of the performance data. If the access enablement mechanism 162 is disabled, the user will only be able to access a limited portion of the performance data.

The performance data transmission mechanism 170 transmits performance data to the performance data collection mechanism for remote systems 130 in the vendor computer system 110 via some kind of network connection 142. In the preferred embodiments, performance data transmission mechanism 170 includes a transmission enablement mechanism 172 that determines whether the customer will allow transmission of the performance data to the vendor. If the transmission enablement mechanism 172 is enabled, the performance data transmission mechanism 170 will transmit the performance data 152 to the vendor computer system 110. If the transmission enablement mechanism 172 is disabled, the performance data transmission mechanism 170 will not transmit the performance data 152 to the vendor computer system 110.

In the preferred embodiments, the state of the access enablement mechanism 162 depends directly on the state of the transmission enablement mechanism 172. If the transmission enablement mechanism 172 is enabled, the access enablement mechanism 162 will also be enabled. If the transmission enablement mechanism 172 is disabled, the access enablement mechanism 162 will also be disabled. Thus, if a customer agrees to share the performance data with the vendor by enabling the transmission enablement mechanism 172, the customer gains access to the performance data via performance data access mechanism 160. In this manner, the vendor gains access to the customer's performance data 152 in exchange for the customer gaining the ability to access (and therefore analyze) the performance data 152. Note that the business method of the preferred embodiments includes any type of compensation in either direction between the vendor and the customer. In one scenario, the customer would pay for a software product sold by the vendor that includes the performance data access mechanism 160 and associated software for analyzing the performance data. The performance data access mechanism 160 would then assure that transmission of the performance data to the vendor is enabled before allowing access and analysis of the performance data 152. In another scenario, the customer's performance data may be so valuable that the vendor may supply the performance data access mechanism 160 to the customer for free, or may pay the customer for sharing the performance data. Whatever the specifics of the arrangement between vendor and customer, if the transmission of the performance data to the vendor is enabled, the customer will be given enhanced access to the performance data 152 collected on the customer's computer system.

Figure 2:
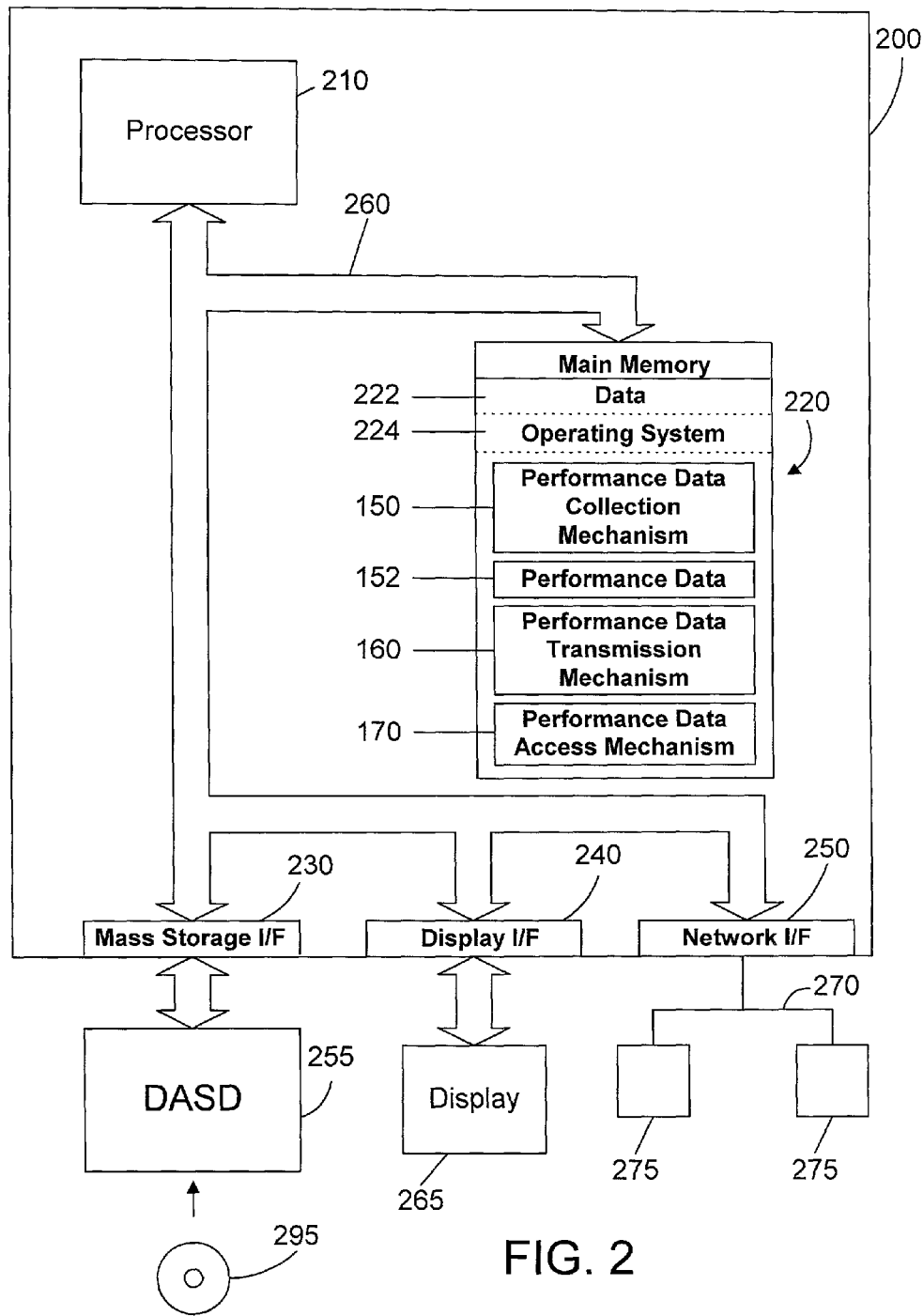
FIG. 2 is a block diagram of one specific implementation of customer computer system 120 of FIG. 1 in accordance with the preferred embodiments.

Referring now to FIG. 2, a computer system 200 in accordance with the preferred embodiment is an IBM iSeries computer system. However, those skilled in the art will appreciate that the mechanisms and apparatus of the present invention apply equally to any computer system, regardless of whether the computer system is a complicated multi-user computing apparatus. a single user workstation, or an embedded control system. Computer system 200 is one suitable implementation for customer computer system 120 in FIG. 1. As shown in FIG. 2, computer system 200 comprises a processor 210, a main memory 220, a mass storage interface 230, a display interface 240, and a network interface 250. These system components are interconnected through the use of a system bus 260. Mass storage interface 230 is used to connect mass storage devices (such as a direct access storage device 255) to computer system 200. One specific type of direct access storage device 255 is a readable and writable CD ROM drive, which may store data to and read data from a CD ROM 295.

Main memory 220 in accordance with the preferred embodiments contains data 222, an operating system 224, performance data collection mechanism 150, performance data 152, performance data access mechanism 160, and performance data transmission mechanism 170. Note that performance data collection mechanism 150, performance data 152, performance data access mechanism 160, and performance data transmission mechanism 170 are discussed above with reference to FIG. 1. While the performance data collection mechanism 150, performance data 152, performance data access mechanism 160, and performance data transmission mechanism 170 are shown separate and discrete from operating system 224 in FIG. 2, the preferred embodiments expressly extend to any or all of mechanisms 150, 160 and 170 being implemented within the operating system 224. In the most preferred embodiment, performance collection mechanism 150 is part of the operating system 224 because the operating system 224 already collects performance data. Performance data access mechanism 160 and performance data transmission mechanism 170 could also be implemented within the operating system 224, or could be supplied as separate programs. Note also that the functions of these three mechanisms 150, 160 and 170 could be appropriately split out or combined within the scope of the preferred embodiments to arrive a single computer program or any suitable number of computer programs that perform the functions described herein within the scope of the preferred embodiments.

Computer system 200 utilizes well known virtual addressing mechanisms that allow the programs of computer system 200 to behave as if they only have access to a large, single storage entity instead of access to multiple, smaller storage entities such as main memory 220 and DASD device 255. Therefore, while data 222, operating system 224, performance data collection mechanism 150, performance data 152, performance data access mechanism 160, and performance data transmission mechanism 170 are shown to reside in main memory 220, those skilled in the art will recognize that these items are not necessarily all completely contained in main memory 220 at the same time. It should also be noted that the term "memory" is used herein to generically refer to the entire virtual memory of computer system 200.

Data 222 represents any data that serves as input to or output from any program in computer system 200. Operating system 224 is a multitasking operating system known in the industry as OS/400; however, those skilled in the art will appreciate that the spirit and scope of the present invention is not limited to any one operating system.

Processor 210 may be constructed from one or more microprocessors and/or integrated circuits. Processor 210 executes program instructions stored in main memory 220. Main memory 220 stores programs and data that processor 210 may access. When computer system 200 starts up, processor 210 initially executes the program instructions that make up operating system 224. Operating system 224 is a sophisticated program that manages the resources of computer system 200. Some of these resources are processor 210, main memory 220, mass storage interface 230, display interface 240, network interface 250, and system bus 260.

Although computer system 200 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 210. However, those skilled in the art will appreciate that the present invention applies equally to computer systems that simply use I/O adapters to perform similar functions.

Display interface 240 is used to directly connect one or more displays 265 to computer system 200. These displays 265, which may be non-intelligent (i.e., dumb) terminals or fully programmable workstations, are used to allow system administrators and users to communicate with computer system 200. Note, however, that while display interface 240 is provided to support communication with one or more displays 265, computer system 200 does not necessarily require a display 265, because all needed interaction with users and other processes may occur via network interface 250.

Network interface 250 is used to connect other computer systems and/or workstations (e.g., 275 in FIG. 2) to computer system 200 across a network 270. The present invention applies equally no matter how computer system 200 may be connected to other computer systems and/or workstations, regardless of whether the network connection 270 is made using present-day analog and/or digital techniques or via some networking mechanism of the future. In addition, many different network protocols can be used to implement a network. These protocols are specialized computer programs that allow computers to communicate across network 270. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROM (e.g., 295 of FIG. 2), and transmission type media such as digital and analog communications links.

Figure 3:
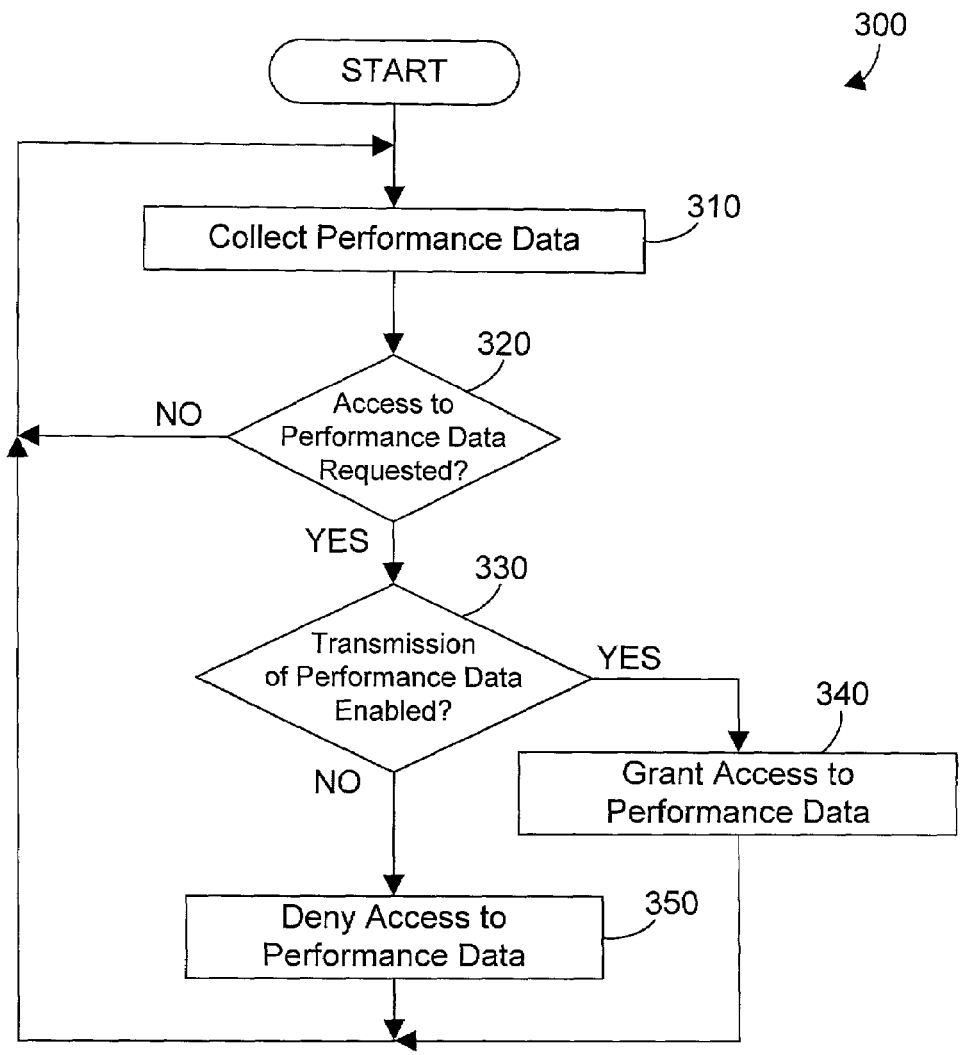
FIG. 3 is a flow diagram of a method for allowing customer access to performance data in accordance with a first embodiment.

Referring now to FIG. 3, a method 300 in accordance with a first embodiment prevents all access to performance data unless transmission of the performance data to the vendor is enabled. The customer computer system collects the performance data (step 310). If a user of the customer computer system requests access to the performance data (step 320=YES), method 300 then determines whether the transmission of the performance data is enabled (step 330). If so (step 330=YES), the user's request to access the performance data is granted (step 340). If transmission is not enabled (step 330=NO), the user's request to access the performance data is denied (step 350). In this manner the customer cannot access any performance data unless transmission of performance data to the vendor is enabled.

Figure 4:
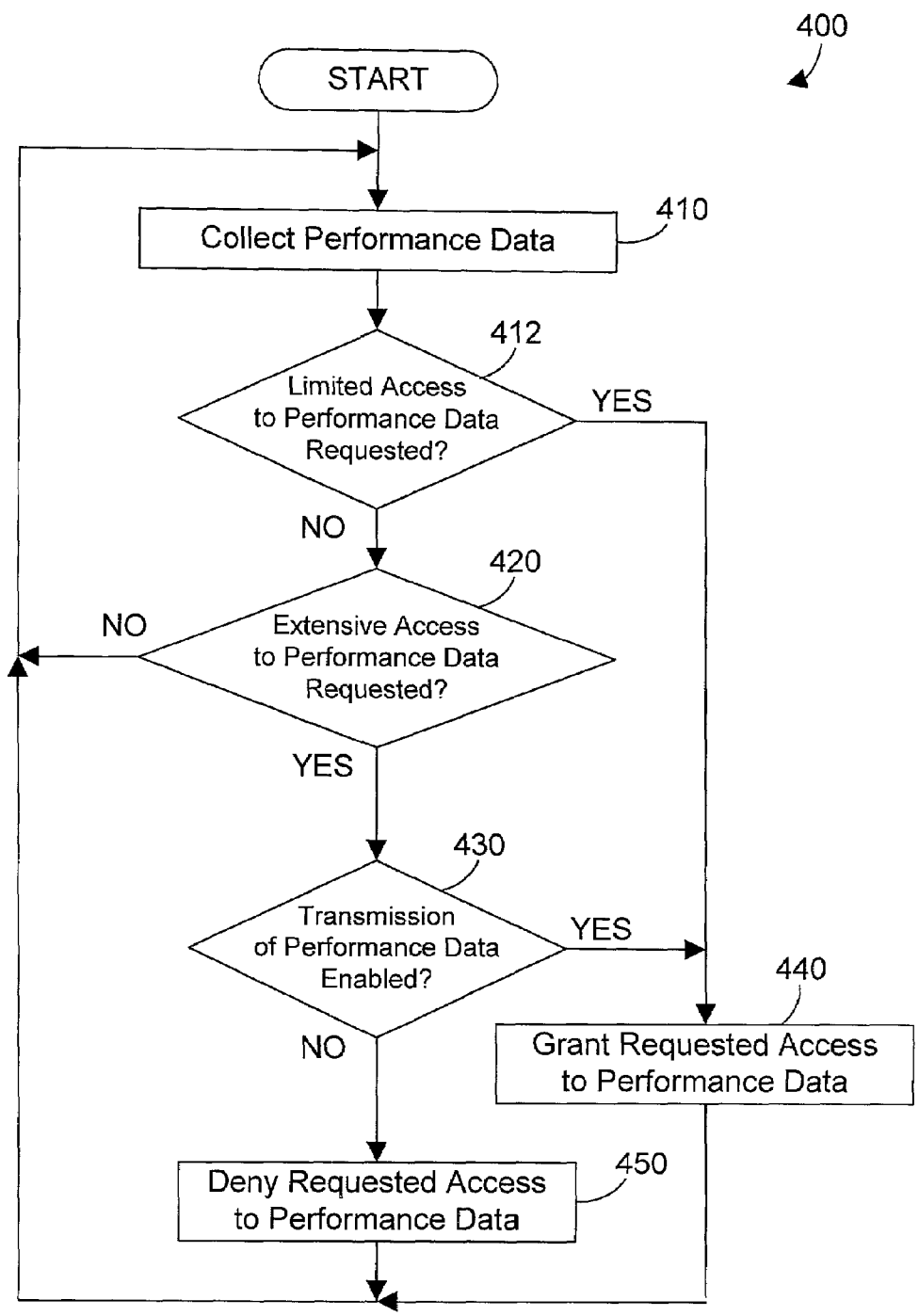
FIG. 4 is a flow diagram of a method for allowing customer access to performance data in accordance with a second embodiment.

Referring now to FIG. 4, a method 400 in accordance with a second embodiment provides limited access to performance data without regard to whether transmission of the performance data is enabled or not. More extensive access to the performance data is not allowed unless transmission of the performance data to the vendor is enabled. The customer computer system collects the performance data (step 410). If only limited access to the performance data is requested (step 412=YES), the request is granted (step 440). If limited access to the performance data is not requested (step 412=NO), method 400 then determines whether extensive access has been requested (step 420). If not (step 420=NO), method 400 loops back to step 410 and continues. If so (step 420=YES), method 400 checks to see if transmission of performance data to the vendor is enabled (step 430). If transmission to the vendor is enabled (step 430=YES), the request for extensive access is granted (step 440). If transmission to the vendor is not enabled (step 430=NO), the request for extensive access is denied (step 450).

Figure 5:
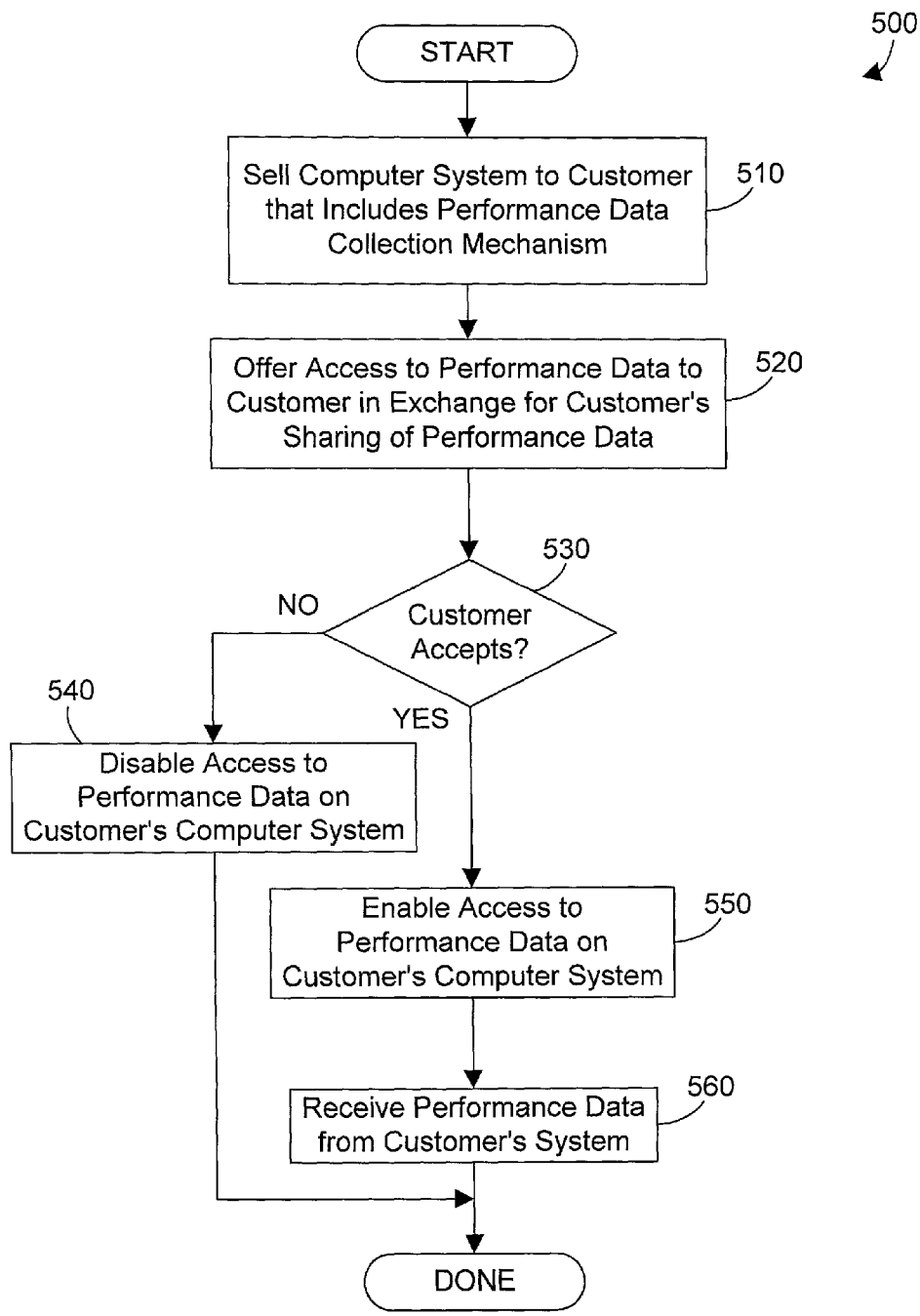
FIG. 5 is a flow diagram showing the steps in a business method in accordance with the preferred embodiments.

A business method (or method for doing business) is also within the scope of the preferred embodiments. Referring to FIG. 5, a method 500 for a computer vendor to do business begins by selling a computer system that includes the performance data collection mechanism to a customer (step 510). Next, the vendor offers access to the performance data to the customer in exchange for the customer sharing the performance data with the vendor (step 520). If the customer rejects the offer in step 520 (step 530=NO), access to the performance data on the customer's computer system is disabled (step 540). If the customer accepts the offer in step 520 (step 530=YES), access to the performance data on the customer's computer system is enabled (step 550). The vendor system will then (at some point in time) receive the performance data from the customer's computer system (step 560). The business method of the preferred embodiments strikes an effective balance between the customer's desire to access and analyze performance data with the vendor's need to receive the performance data from the customer. Note that not all steps in method 500 must be performed to practice the invention. For example, step 510 need not be performed. Instead of the vendor of the computer system receiving the performance data, a company could offer a service within the scope of the preferred embodiments that analyzes performance data gathered on a computer system sold by a different company. In this scenario, step 510 would be performed by the computer system vendor, while steps 520–560 would be performed by a different vendor that is providing the service of analyzing the performance data for the customer. Of course, other scenarios are possible within the scope of the preferred embodiments. In addition, method 500 expressly encompasses both methods 300 and 400 discussed above. In the case of method 300, step 540 disables all access to performance data, while step 550 enables all access to performance data. In the case of method 400, step 540 disables extended access to performance data but allows limited access to performance data, while step 550 enables all access to performance data.

Figure 6:
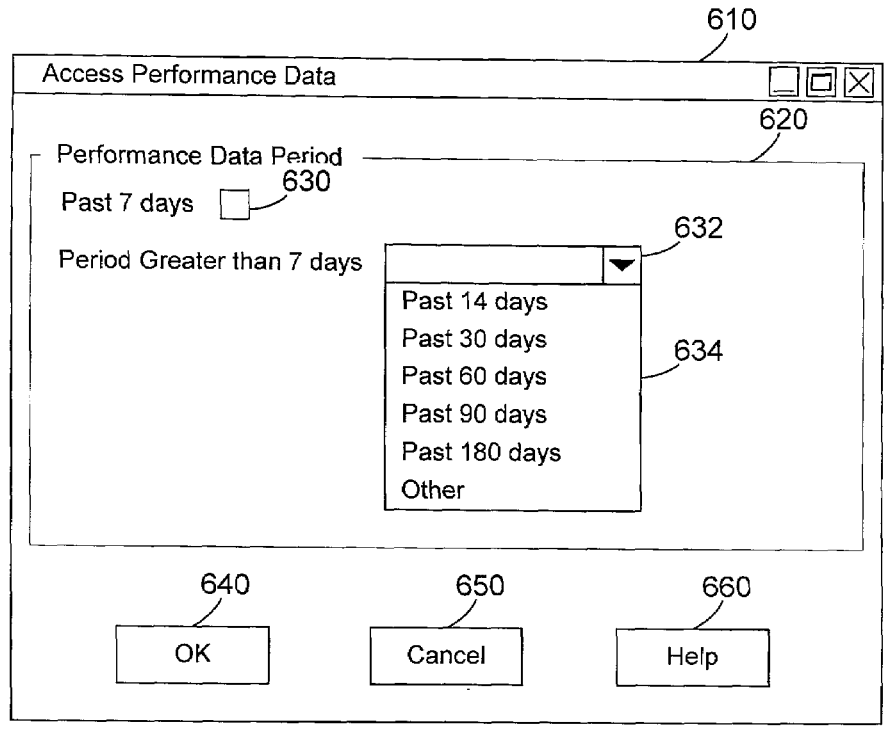
FIG. 6 is a display panel on a graphical user interface that allows a user to select a time period for which the user wants to access performance data.
Figure 7:
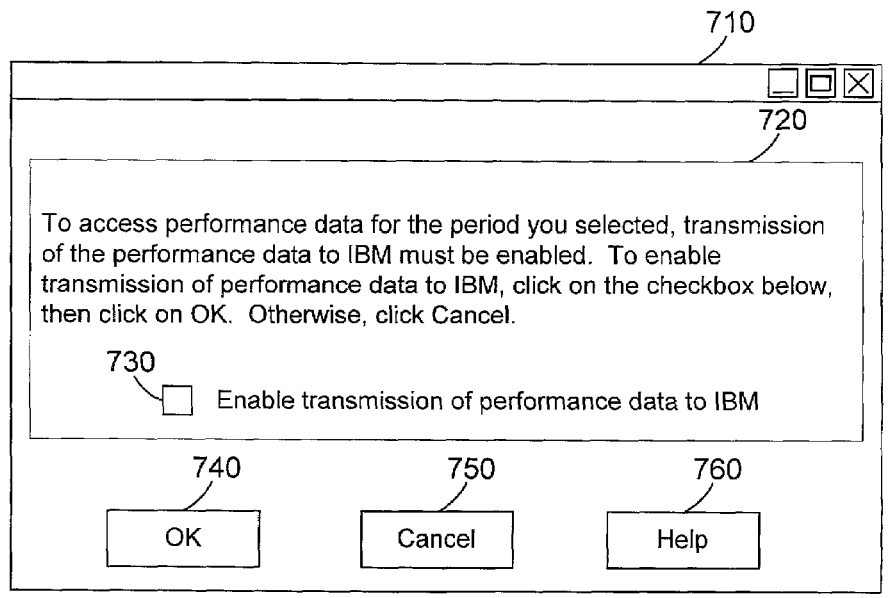
FIG. 7 is a display panel on a graphical user interface that allows a user to enable transmission of the performance data to the vendor before allowing customer access to the performance data.

Referring now to FIGS. 6 and 7, display panels on a graphical user interface are shown that allow a customer to freely access limited performance data, but that require transmission of the performance data to the vendor to be enabled before allowing customer access to extended performance data. Thus, the display panels of FIGS. 6 and 7 are one suitable implementation of certain portions of method 400 in FIG. 4. In display panel 610 of FIG. 6, a message box 620 prompts the user to select the period for which the user desires to access performance data. The user can click on the checkbox 630 that corresponds to a period of the past seven days, or the user can click on the down arrow 632, which causes a drop-down menu 634 to be displayed. A user may select the past 14 days, past 30 days, past 60 days, past 90 days, or past 180 days from the drop-down menu 634. In addition, the user may select the "Other" selection on drop-down menu 634, which causes a text entry box to be presented where the user may enter a number of days, weeks, or months. Once the user has selected the performance data period, the user clicks the OK button 640. If the user wants to exit display panel 610, the user may click the Cancel button 650. If the user needs context-sensitive help, the user may click on the Help button 660.

If the user clicks the checkbox 630 for the last seven days, the user will be given access to the limited performance data for this period. If, however, the user has selected more than seven days of performance data (i.e., extended performance data), transmission of the performance data to the vendor must be enabled. We assume for this example that the vendor is IBM, and that transmission of performance data to IBM has not yet been enabled. Thus, if the user selects any selection from drop-down menu 634, then clicks the OK button 640, a display panel 710 in FIG. 7 is presented to the user that informs the user than enabling transmission of the performance data to IBM is required in order for the user to access performance data for the specified period of time. If the user desires to enable transmission of the performance data to IBM, the user clicks on checkbox 730, then clicks on the OK button 740. If the user decides to not enable transmission of the performance data to IBM, the user clicks on the Cancel button 740. In this case, the user will not be allowed to access performance data for the requested period. Of course, if the user needs help, the user may click on the Help button 760.

In the preferred embodiments, the best mode of the invention enables access to all of the customer's performance data if transmission of all of the customer's performance data to the vendor is enabled. Note, however, that accessing a portion of the performance data by the customer and transmitting a portion of the performance data to the vendor is also within the scope of the preferred embodiments. Thus, a customer may gain access to all of the performance data by agreeing to only transmit a portion of the performance data to the vendor. In similar fashion, the customer may gain access to only a portion of the performance data by agreeing to transmit all of the performance data to the vendor. Similarly, a customer may gain access to only a portion of the performance data by agreeing to transmit a different portion of the performance data to the vendor. It is expressly understood herein that a customer's access to performance data may mean access to all or part of the performance data, and transmitting performance data to a vendor likewise means transmitting all or part of the performance data.

Customer access to performance data is discussed herein in terms of a "user" accessing the performance data on the customer's computer system. Note that the term "user" is a broad term that includes human users as well as computer programs that request access to performance data. The GUI display panels in FIGS. 6 and 7 would be useful for interacting with a human user, while interaction with a computer program user could occur without display or intervention by a human user.

The preferred embodiments described herein provide incentive for customers to share performance data for their computer systems with the computer system's vendor. By providing customer access to performance data only if transmission of the performance data is enabled, the vendor can increase the likelihood of receiving the performance data from customers, thereby providing enhanced marketing opportunities for goods and services.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, the preferred embodiments expressly extend to any type of computer system, from large mainframe computer systems to the smallest microcontroller in an embedded application (such as an automotive computer).

What is claimed is:

1. A computer system comprising:
   at least one processor;
   a memory coupled to the at least one processor;
   a performance data collection mechanism residing in the memory and executed by the at least one processor, the performance data collection mechanism collecting performance data for the computer system;
   a performance data transmission mechanism residing in the memory and executed by the at least one processor, the performance data transmission mechanism, when enabled, transmitting at least a portion of the performance data to another computer system coupled to the computer system via a network; and
   a performance data access mechanism residing in the memory and executed by the at least one processor, the performance data access mechanism allowing access to the performance data by a user of the computer system only if the performance data transmission mechanism is enabled.

2. The computer system of claim 1 wherein the computer system comprises a customer computer system and the another computer system comprises a vendor computer system.

3. The computer system of claim 1 wherein the performance data comprises data collected by an operating system residing in the memory and executed by the at least one processor.

4. The computer system of claim 1 wherein the performance data collection mechanism, the performance data transmission mechanism, and the performance data access mechanism are all controlled by an operating system residing in the memory and executed by the at least one processor.

5. A networked computer system comprising:
   (A) a first computer system;
   (B) a second computer system coupled to the first computer system via a network, the second computer system comprising:
      (B1) a performance data collection mechanism that collects performance data for the second computer system;
      (B2) a performance data transmission mechanism that, when enabled, transmits at least a portion of the performance data to the first computer system; and
      (B3) a performance data access mechanism that allows access to the performance data by a user of the second computer system only if the performance data transmission mechanism is enabled.

6. The networked computer system of claim 5 wherein the first computer system comprises a vendor computer system and the second computer system comprises a customer computer system.

7. The networked computer system of claim 5 wherein the performance data comprises data collected by an operating system.

8. A method for a user of a second computer system coupled via a network to a first computer system to access performance data collected by the second computer system, the method comprising the steps of:
   (A) the second computer system collecting the performance data;
   (B) the second computer system determining whether transmission of the performance data from the second computer system to the first computer system is enabled;
   (C) if transmission of the performance data from the second computer system to the first computer system is enabled, allowing the user to access the performance data; and
   (D) if transmission of the performance data from the second computer system to the first computer system is not enabled, not allowing the user to access the performance data.

9. A method for a first computer system to collect performance data from a second computer system coupled via a network to the first computer system, the method comprising the steps of:
   (A) the second computer system collecting the performance data;
   (B) the second computer system determining whether transmission of the performance data from the second computer system to the first computer system is enabled;
   (C) if transmission of the performance data from the second computer system to the first computer system is enabled, allowing access to the performance data by a user of the second computer system;
   (D) if transmission of the performance data from the second computer system to the first computer system is not enabled, not allowing access to the performance data by a user of the second computer system; and
   (E) the second computer system transmitting at least a portion of the performance data to the first computer system.

10. A method for a user of a second computer system coupled via a network to a first computer system to access performance data collected by the second computer system, the method comprising the steps of:
    (A) the second computer system collecting the performance data;
    (B) the second computer system allowing the user to access a limited portion of the performance data;
    (C) if the user requests to access more than the limited portion of the performance data:
       (C1) the second computer system determining whether transmission of the performance data from the second computer system to the first computer system is enabled;
       (C2) if transmission of the performance data from the second computer system to the first computer system is enabled, allowing the user to access the requested performance data; and
       (C3) if transmission of the performance data from the second computer system to the first computer system is not enabled, not allowing the user to access the requested performance data.

11. A method for a first computer system to collect performance data from a second computer system coupled via a network to the first computer system, the method comprising the steps of:
    (A) the second computer system collecting the performance data;
    (B) the second computer system allowing the user to access a limited portion of the performance data;
    (C) if the user requests to access more than the limited portion of the performance data:
       (C1) the second computer system determining whether transmission of the performance data from the second computer system to the first computer system is enabled;
       (C2) if transmission of the performance data from the second computer system to the first computer system is enabled, allowing access to the requested performance data by a user of the second computer system;

(C3) if transmission of the performance data from the second computer system to the first computer system is not enabled, not allowing access to the requested performance data by a user of the second computer system; and (C4) the second computer system transmitting at least a portion of the performance data to the first computer system.

12. A method for doing business comprising the steps of:
(A) offering to a customer the ability to access performance data gathered by a customer computer system in exchange for the customer's sharing of the performance data;
(B) if the customer does not accept the offer in (A), disabling customer access to the performance data on the customer computer system;
(C) if the customer accepts the offer in (A), enabling customer access to the performance data on the customer computer system.

13. The method of claim 12 further comprising the step of:
(D) the customer computer system sharing the performance data.

14. The method of claim 12 further comprising the step of: selling the customer computer system to the customer.

15. A program product comprising:
(A) a performance data collection mechanism that collects performance data for a first computer system;
(B) a performance data transmission mechanism that, when enabled, transmits at least a portion of the performance data to a second computer system;
(C) a performance data access mechanism that allows access to the performance data only if the performance data transmission mechanism is enabled; and
(D) computer-readable signal bearing media bearing (A), (B) and (C).

16. The program product of claim 15 wherein the signal bearing media comprises recordable media.

17. The program product of claim 15 wherein the signal bearing media comprises transmission media.

18. The program product of claim 15 wherein the performance data comprises data collected by an operating system.

19. A program product comprising:
(A) an operating system comprising:
(A1) a performance data collection mechanism that collects performance data for a first computer system;
(A2) a performance data transmission mechanism that, when enabled, transmits at least a portion of the performance data to a second computer system;
(A3) a performance data access mechanism that allows access to the performance data only if the performance data transmission mechanism is enabled; and
(B) computer-readable signal bearing media bearing the operating system.

20. The program product of claim 19 wherein the signal bearing media comprises recordable media.

21. The program product of claim 19 wherein the signal bearing media comprises transmission media.

22. The program product of claim 19 wherein the performance data comprises data collected by an operating system.

* * * * *